Oct. 16, 1923.

A. S. GILBERT

RESIDUE WEIGHER

Filed Nov. 30, 1920

1,470,829

INVENTOR:
ARTHUR S. GILBERT
BY George E. Folkes
ATTORNEY.

Patented Oct. 16, 1923.

1,470,829

UNITED STATES PATENT OFFICE.

ARTHUR STUART GILBERT, OF BIRMINGHAM, ENGLAND, ASSIGNOR TO W. & T. AVERY, LIMITED, OF BIRMINGHAM, ENGLAND.

RESIDUE WEIGHER.

Application filed November 30, 1920. Serial No. 427,359.

*To all whom it may concern:*

Be it known that ARTHUR STUART GILBERT, a subject of the King of Great Britain, residing at Soho Foundry, Birmingham, England, have invented a new and useful Improvement in Residue Weighers; and he does hereby declare the following to be a full, clear, and exact description of the same.

This invention has reference to improvements in residue weighers employed in conjunction with automatic weighing scales and refers particularly to residue weighers of the kind described in the United States Patent No. 1,233,641 wherein a record of the residue may be obtained. In the aforesaid prior specification the graduations upon the steelyard were arranged in what is normally a reverse direction to that in common practice in connexion with ordinary weighing steelyards, and it has been found that in certain instances this reversal of the order of the graduation has led to confusion or mitigated against the rapidity of operation or adaptation of the residue weigher. The present invention obviates this disadvantage by employing a steelyard wherein the graduations upon the steelyard are arranged in the opposite directions to those of the aforesaid apparatus, that is in the ordinary manner of a weighing steelyard, the zero graduation being nearest to the fulcrum of the steelyard.

The invention comprises a residue weigher of the kind wherein the record is obtained from a steelyard and adjustable poise weight mechanism, said steelyard being graduated from the fulcrum of the steelyard, the steelyard being overbalanced in itself or by means of weights connected thereto by levers or linkage.

The invention is capable of being carried into effect in different ways but for the purpose of the present specification one means will be particularly described and ascertained with reference to the accompanying sheet of drawings, wherein:—

Figure 1:
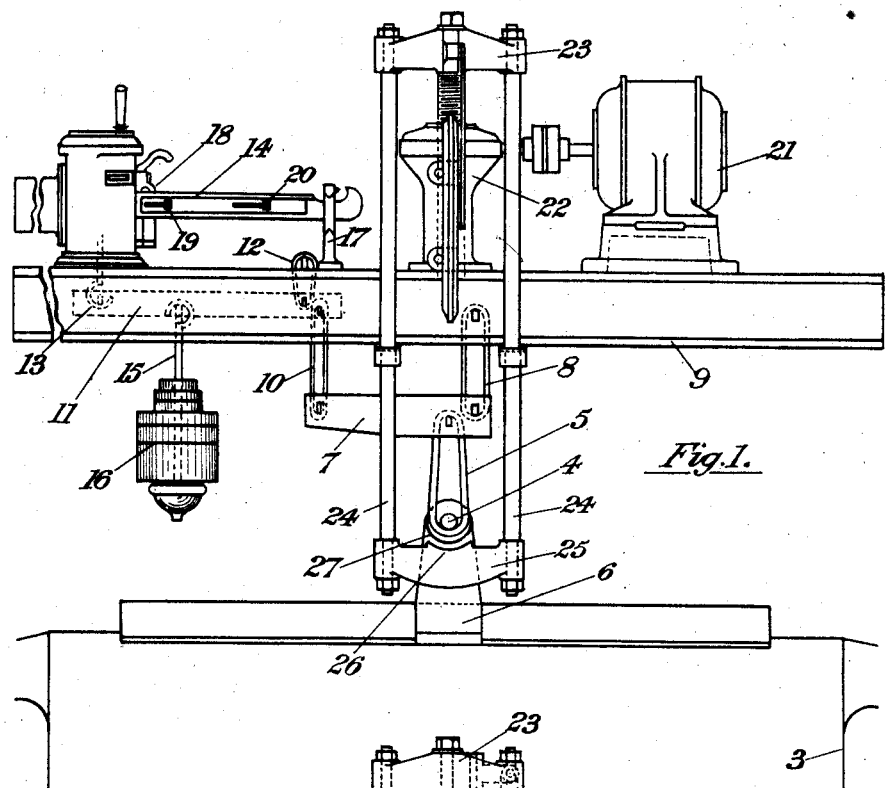
Figure 2:
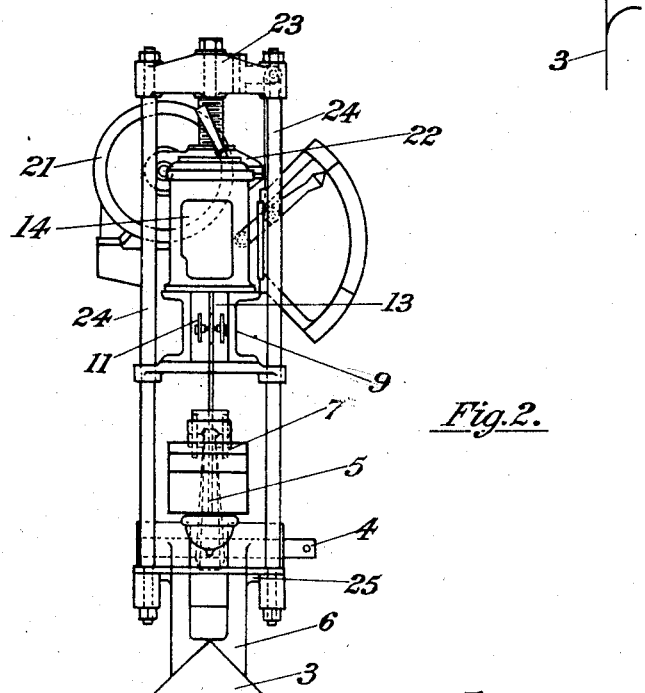

Fig. 1 is an elevation of so much of the apparatus as is necessary to an understanding of the present invention, and Fig. 2 is an elevation looking on the left hand side of Fig. 1.

The weight box 3 of the automatic weighing scale can be coupled at will by means of a loose pin 4 with a link 5 the pin 4 passing through a bracket 6 connected to the weight box. The link 5 is suspended from one of the knife-edges of a lever 7 which is fulcrumed by means of the link 8 on the girder framework 9, this lever 7 is connected by means of a link 10 to a second lever 11 in order to increase the power in known manner, the second lever 11 being suspended from the girder framework 9 by means of the link 12 and being connected at the other end by the rod 12 to a steelyard 14. Suspending from the lever 11 by means of the rod 15 are a series of weights 16 by means of which the steelyard 14 is overbalanced, the weight 16 serving to counterbalance the normal weight of the weight box 3 and of the weights therein and of the lever system hereinbefore referred to in such a manner that when a residue is being weighed the weight box is connected to the residue system by the loose pin 4 and the weight box and weights and the lever system is counterbalanced or overbalanced by the series of weights 16 in such a manner that the nose end of the steelyard 14 rises to the top of the carrier bracket 17. The steelyard is brought in equilibrium by means of a poise weight 18 and subordinate poise weights 19 and 20 which are traversed from the fulcrum end of the steelyard toward the nose or free end in the normal manner, the position of the poise weights determining the amount of residue in the weigh hopper of the apparatus in the manner well known in connection with the weighing of the weight of a residue.

For the purpose of lifting the weight box 3 a motor 21 is employed which is coupled to the screw gear or jack 22 which raises and lowers the yoke 23 which is coupled by means of the four rods 24 to the bottom yoke 25 which is provided with a concave seating 26 adapted to be brought into contact with the convex seating 27 formed on the bracket 6 of the weight box, by this means the loose pin 4 can be readily engaged with or removed from the link 5 and the bracket 6 as required.

When the automatic weighing scale is functioning in its normal manner the weight box 3 is dependent from the weighbeam of the scale, the loose pin 4 being removed so that no connexion exists between the weight box and the residue weighing lever system.

Claims:—

1. A residue weigher for use in combination with automatic scales, comprising in combination a steelyard, a poiseweight traversably mounted on said steelyard, a lever connected to said steelyard, a load receiver adapted for connexion to said lever, weights suspended from said lever to overbalance the steelyard against the resistance of the load receiver and the weights therein, a weight recording mechanism operable in conjunction with said steelyard and poiseweight and means for connecting and disconnecting the load receiver from the levers connected to the steelyard.

2. A residue weigher for use in combination with automatic scales, comprising in combination a steelyard, a poiseweight traversably mounted on said steelyard, a lever connected to said steelyard, a load receiver adapted for connexion to said lever weights suspended from said lever to overbalance the steelyard against the resistance of the load receiver and the weights therein, a weight recording mechanism operable in conjunction with said steelyard and poiseweight, means for connecting and disconnecting the load receiver from the levers connected to the steelyard, including a power operated screw jack for raising and lowering the load receiver.

In testimony whereof, I have signed my name to this specification.

ARTHUR STUART GILBERT.